Figure 1:
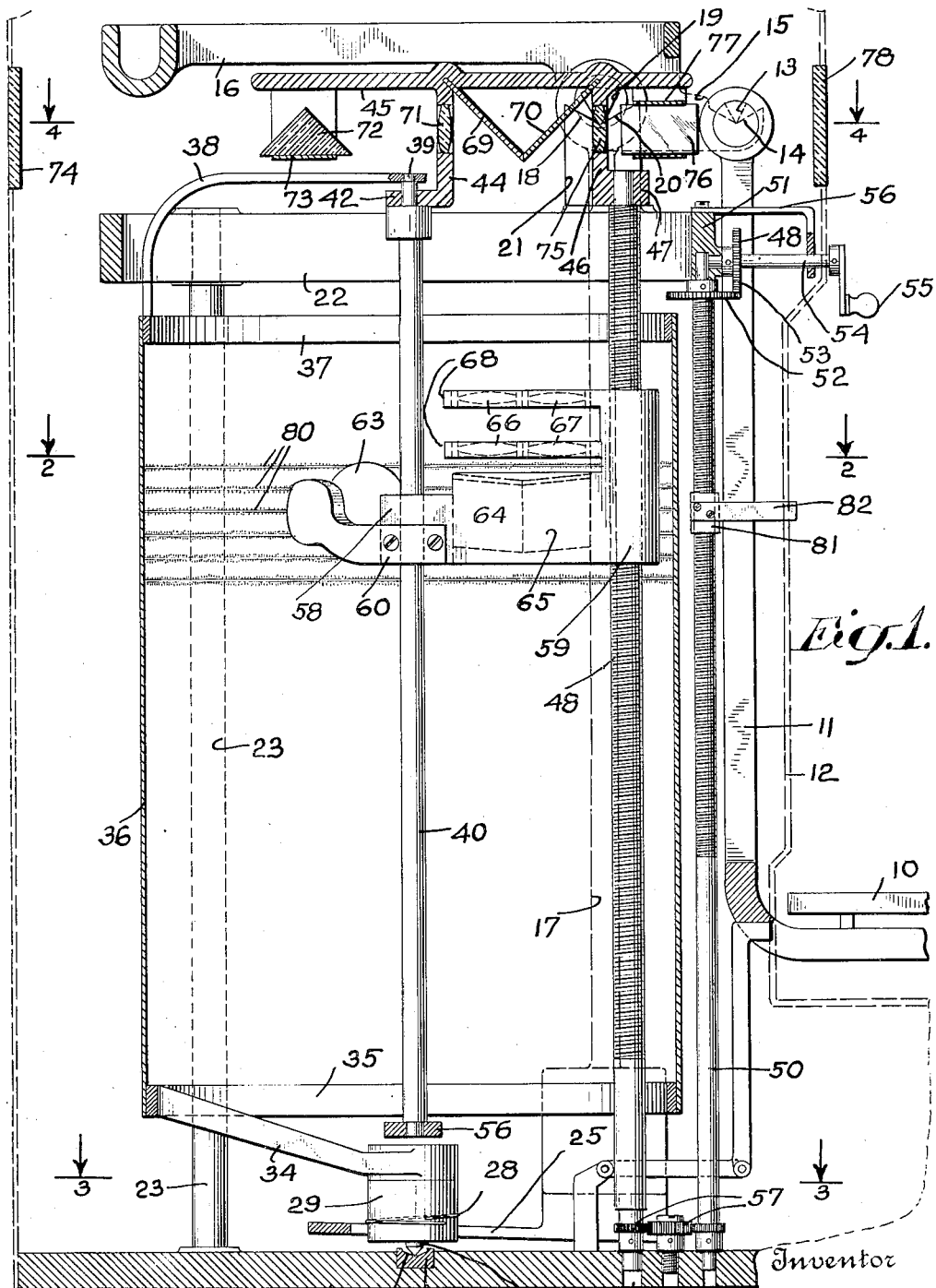

Oct. 4, 1932.   F. M. CARROLL   1,880,415
COMPUTING SCALE
Filed Oct. 22, 1927   3 Sheets-Sheet 1

Inventor
Fred M. Carroll
By his Attorney

Oct. 4, 1932.  F. M. CARROLL  1,880,415
COMPUTING SCALE
Filed Oct. 22, 1927  3 Sheets-Sheet 2

Inventor
Fred M. Carroll
By his Attorney

Oct. 4, 1932.  F. M. CARROLL  1,880,415
COMPUTING SCALE
Filed Oct. 22, 1927  3 Sheets-Sheet 3

Inventor
Fred M. Carroll
By his Attorney

Patented Oct. 4, 1932

1,880,415

UNITED STATES PATENT OFFICE

FRED M. CARROLL, OF YONKERS, NEW YORK, ASSIGNOR TO DAYTON SCALE COMPANY, OF DAYTON, OHIO, A CORPORATION OF NEW JERSEY

COMPUTING SCALE

Application filed October 22, 1927. Serial No. 227,988.

This invention relates to weighing scales, particularly of the computing type.

In the scale art, some of the computing scales utilize a drum chart which is moved in accordance with the weight thereon. This drum is provided upon its periphery with a number of scales, each graduated in accordance with a particular price per unit weight or rate. In the operation of the scale, the graduations disclose opposite a reading line, the computed cost corresponding to a given weight and price. The size of the drum is limited by the low inherent power of the scale. For this reason, the scales of computed prices have been made with minutely spaced graduations and have been difficult to read. Certain computing scales have been provided with a chart having a double row of scales to permit reading of the weight and price data at the back and front of the drum by both customer and clerk. These scales have further condensed the scale sizes particularly in width. In order to facilitate the reading of the graduations, magnifying and illuminating devices have been utilized. These have been found unsatisfactory because they require the customer to be close to and directly over the scale graduations. An optical system has been disclosed in Patent No. 1,487,514, issued to H. T. Goss and assigned to assignee of the present application, which displays images of graduations on a drum chart upon a pair of opposing screens, one for inspection by customer and the other for use of the clerk. The construction of the Goss scale is such as to require the scale rows on the chart to bear duplicate graduations, each graduation being projected separately upon one of the screens.

The object of this invention is to provide an improved optical system for computing scales of the drum type.

Another object is to increase the capacity of a drum type scale, which is adapted to display a reading to both customer and clerk by using a chart having only one set of graduations.

Another object is to project the image of a single indication on a drum chart in more than one direction for display upon a plurality of screens.

Still another object is to position the optical system within an opaque drum chart, thus providing a very compact scale.

Other objects and advantages will be apparent from the accompanying description and the appended drawings, wherein similar reference numerals indicate similar parts.

In the drawings:

Fig. 1 is a longitudinal side section through the scale.

Figure 2:
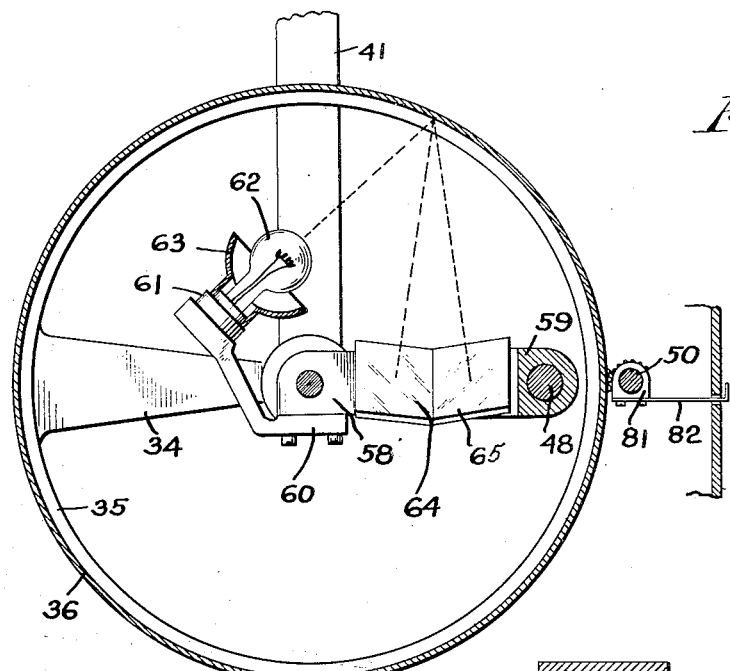
Figure 3:
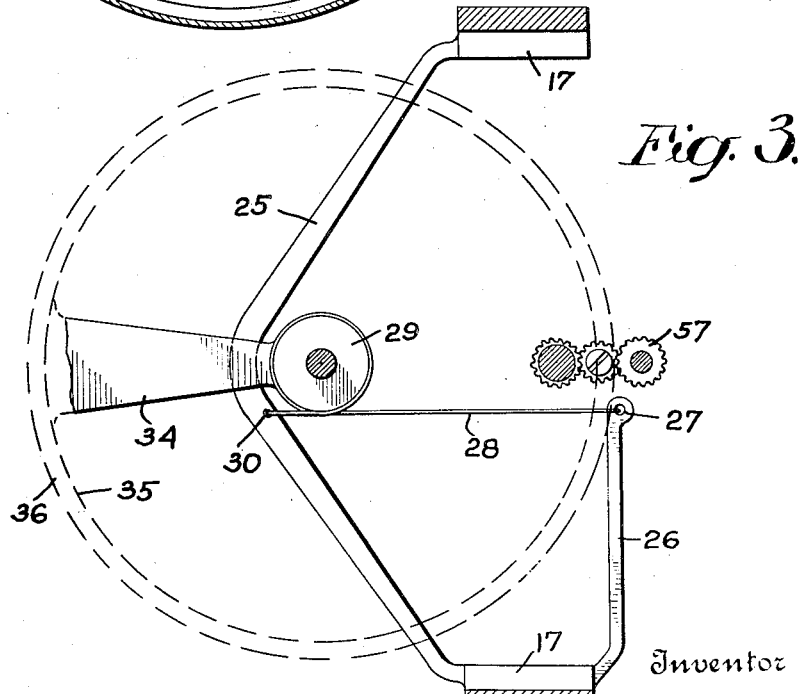
Figure 4:
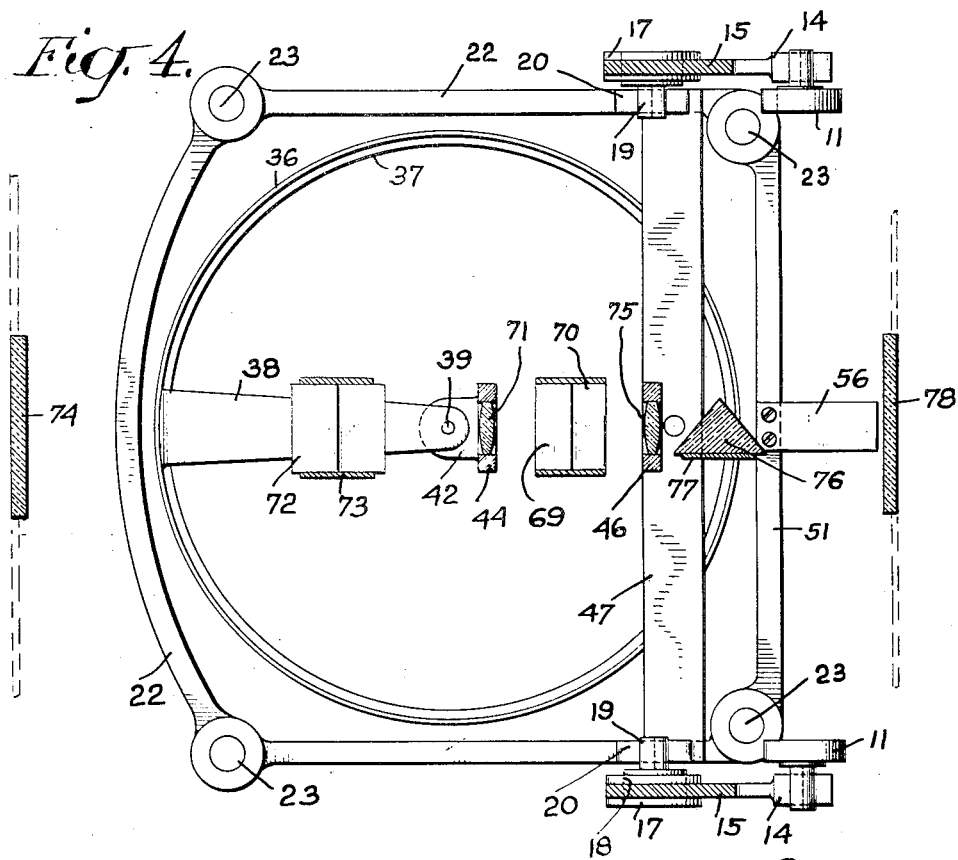
Figure 5:
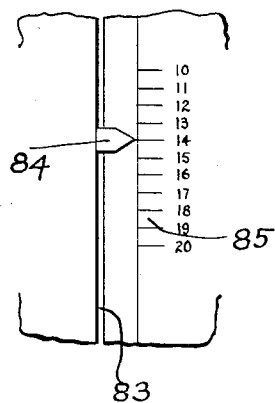
Figure 6:
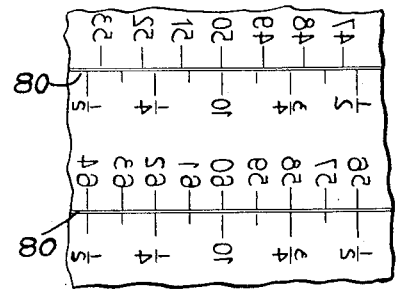

Fig. 2 is a section on line 2—2 of Fig. 1.
Fig. 3 is a section on line 3—3 of Fig. 1.
Fig. 4 is a section on line 4—4 of Fig. 1.
Fig. 5 is a detail view of the front of the scale housing showing some of the graduations for indicating the rate being used.
Fig. 6 shows a fragment of the chart.

In detail, the scale comprises a platform 10 upon which the object to be weighed is placed by the clerk. The load on the platform is transmitted to levers 11 extending within the scale housing 12. The upper ends of the levers are provided with knife edges 13 which rest on the bottom of bearings 14 formed in the ends of arms 15 (Figs. 1 and 4) of a pendulum structure. At its upper end the pendulum has a horizontal weight-offsetting projection 16. A pair of vertical arms 17 extend vertically downward from the pendulum arm 16. At the intersection of the arm 17 and arm 16, the pendulum has circular openings 18 in which are fixed knife edges 19 resting on bearings 20 formed at the upper end of a post 21. The post is mounted on a stationary four sided frame 22 (Fig. 4) which is supported on posts 23 resting on the base 24. The pendulum is thus adapted to oscillate on knife edges 19 whenever a load is placed on the scale platform.

At their lower ends, the vertical pendulum arms 17 are joined by a horizontal bowed member 25 (Fig. 3). Opposite the bowed member, one of the arms 17 has a horizontal projection 26 the end of which has an opening 27 in which is fastened a cord or wire 28. The cord or wire is wound once around the periphery of a sleeve 29 and is fastened in a hole 30 in one of the arms of the bowed member 25 opposite projection 26. Sleeve 29 has a shaft 31 rigidly fixed to it and projecting below it. The projecting end is tapered to a point which bears in a tapered recess 32 of a bearing block 33 fixed in the base 24. Sleeve 29 is connected by means of a spoke arm 34 to a circular ring 35 to which the lower end of an opaque drum chart 36 is attached. At its upper end, the chart is fastened to ring 37 similar to ring 35. Ring 37 has an upwardly and inwardly extending arm 38, the free end of which has an opening rotatably receiving the cylindrical end 39 of a rod 40. The rod 40 is aligned with shaft 31 and the drum chart thus rotates on a vertical axis comprising rod 40 and shaft 31. The rod is fixed in position by means of a frame arm 41 (Fig. 2) at its lower end and a horizontal portion 42 (Figs. 1 and 4) of a fixed frame at its upper end. This fixed frame has a vertical arm 44 connecting the portion 42 to a horizontal portion 45 and another vertical arm 46 connecting the portion 45 to a transversely extending horizontal beam 47 mounted on top of frame 22 (see Fig. 4). A threaded shaft 48 located inside of the drum chart is journalled in beam 47 at its upper end and at its lower end rotates in an opening 49 formed in base plate 24. Another threaded shaft 50 outside the drum chart runs parallel to shaft 48 and is journalled at its ends in base plate 24 and one arm 51 of the frame 22 (Figs. 1 and 4). The upper end of shaft 50 has a bevel gear 52 which meshes with a bevel gear 53 on the end of a shaft 54 adapted to be manually rotated by a crank handle 55 outside the housing. The shaft 54 is journalled in arm 51 and supported by a bracket 56 fixed to the arm 51 (see Figs. 1 and 4). Rotation of shaft 50 through bevel gears 52 and 53 is transmitted to shaft 48 by means of gears 57 near the base plate.

A carrier 58 is provided with a threaded sleeve 59 which cooperates with shaft 48. Rotation of the shaft effects vertical movement of the carrier due to the threaded connection. The carrier is also guided in its vertical movement by means of the rod 40. A bracket 60, fastened to the carrier, terminates in a socket portion 61 which carries a lamp 62 the rays from which are directed by a reflector 63, fastened to the socket portion, upon a small portion of the interior surface of the chart. The image of the illuminated portion of the chart is reflected in a pair of mirrors 64 and 65 mounted on the carrier 58 at an angle of 45° to the horizontal so as to reflect the image vertically upwards. Projecting lenses 66 and 67 carried by extensions 68 of the sleeve 59 are respectively mounted vertically above mirrors 64 and 65 and cast the images in the mirrors upon reflectors 69 and 70, respectively. The reflectors are fixed in frame 45 at an angle of 45° to each other and to the horizontal. The image is projected from reflector 69 through a reversing lens 71 mounted in an opening in frame extension 44 and a triangular prismatic lens 72 carried by a bracket 73 integrally depending from frame portion 45. The lens 72 reverses the image vertically which is thus displayed in proper position upon a screen 74 mounted in the housing in view of the customer. Reflector 70 projects the image shown in mirror 65 through a reversing lens 75 (Figs. 1 and 4) mounted in an opening in frame portion 46 and a triangular prismatic lens 76 carried by a bracket 77 depending from frame portion 45. The prismatic lens 76 is adapted to reverse the image horizontally and display it in its proper order and position upon a screen 78 mounted in the housing in view of the clerk.

Referring to Figs. 1 and 6, the chart is provided with a plurality of parallel graduated scales 80 which have cost and weight graduations in vertically reversed positions. Reflector 63 is adapted to cast a beam of light from lamp 62 upon a portion of that one of the scales which is in the same horizontal plane as the center of the lamp and mirrors 64 and 65. The image of this portion of a scale is shown upon the screens 74 and 78 as described and the reading be indicated by an index line located either on the screen or any one of the lenses. Any one of the scales may be selected for reading by the optical system by moving the carrier 58 up or down as required. This movement is effected by turning handle 55. A threaded sleeve 81 cooperates with shaft 50 and is moved thereby either up or down in unison with the carrier 58. The sleeve 81 has fastened to it a plate 82 (Figs. 1 and 2) which extends through a slit 83 in the housing and has a right angular index portion 84 which moves along a graduated portion 85 of the housing. The graduations of portion 85 correspond to the rates for which scales 80 are graduated and when a scale is in position to be read, the index portion 84 is opposite a number which is the price per unit weight or rate in accordance with which the scale to be read is graduated. In operation, after selecting the proper scale by turning crank handle 55, an article to be weighed is placed on platform 10 causing the pendulum arms 17 to swing on the knife edges 19 an amount proportional to the weight. This movement of the pendulum through the wire or cord 28 attached to the pendulum and passing around the sleeve 29 effects a proportional rotation of the sleeve and the scale chart rigid therewith. The chart comes to rest with the cost and weight reading on the selected scale illuminated by the beam from lamp 62. The reading is reflected to mirrors 64 and 65 and in the manner previously described to the screens 74 and 78 to be viewed respectively by customer and clerk.

While I have shown and described and pointed out the fundamental novel features of the invention as applied to a single modification it will be understood that various omissions and substitutions and changes in the form and details of the device illustrated and in its operation may be made by those skilled in the art without departing from the spirit of the invention. I intend to be limited therefore only as indicated by the scope of the following claims.

I claim:

1. In a weighing scale, in combination, weighing mechanism, a hollow rotatable chart, and a selectively adjustable reflector positioned within said chart for reflecting an indication placed on said chart, said chart and reflector being relatively movable under the control of the weighing mechanism.

2. In a weighing scale, in combination, weighing mechanism, a hollow rotatable opaque chart, and a selectively adjustable reflector positioned within said chart for reflecting an indication placed on the interior surface of said chart, means to move said reflector and chart relatively to each other, said means being under the control of the weighing mechanism.

3. In a weighing scale, in combination, weighing mechanism, a rotatable drum chart connected thereto, a reflector positioned within said chart for reflecting an indication from said chart, and a screen upon which the reflection of said indication is displayed.

4. In combination, in a weighing scale, a weight controlled rotatable hollow chart, a reflector mounted within said chart for cooperating therewith to reflect indications therefrom, a pair of oppositely facing screens, and means for intercepting said reflection of indications marked on said chart and projecting it upon said screens.

5. In combination, in a weighing scale, a weight controlled hollow cylindrical opaque chart having a series of graduations marked on its interior, a plurality of oppositely facing screens, means within said chart for reflecting said graduations from said chart, and means for magnifying the reflection of said graduations and projecting it upon said screens.

6. In combination, a hollow opaque chart provided on its inside surface with a series of graduations, means for reflecting said graduations, a screen outside the chart for intercepting said graduations, and a weighing mechanism to which said chart is connected for actuating said chart in accordance with the load.

7. In a computing and weighing scale, in combination, weighing mechanism, a hollow opaque cylindrical chart controlled by said weighing mechanism and being provided on its inside surface with a series of graduations, a lamp mounted within said chart, means for directing a beam from said lamp upon said graduations, and means within said chart for intercepting the reflection of the graduations from the chart.

8. In a weighing scale, in combination, weighing mechanism, a cylindrical chart associated therewith, said chart bearing designations on its interior surface, a plurality of reflectors, and means positioned within said chart for projecting a magnified image of the same area of said designations upon said plurality of reflectors.

9. In a weighing scale, in combination, a weight-controlled hollow chart having a series of graduations representing functions of weight mirrors positioned within said chart and cooperating with said chart to selectively reflect one of said graduations, and means to intercept the reflections of said graduation by the mirrors and direct said reflections in opposite directions.

10. In combination, in a weighing scale, a weighing mechanism, a hollow designation chart controlled by said weighing mechanism, an indicating device comprising a pair of oppositely disposed screens, an opaque mirror for reflecting a designation portion of the chart for display upon one of said screens, and a second opaque mirror for simultaneously reflecting the same designation portion upon the other of said screens.

11. In combination, in a computing scale, weighing mechanism, a hollow chart marked on its inside periphery with a series of weight function graduations, image receiving means mounted outside the hollow chart and a reflector mounted within said hollow chart to reflect said graduations upon said image receiving means, and means included in said weighing mechanism to move said chart and said reflector and image receiving means relatively, whereby said reflecting means effects display on said image receiving means of a designation portion of the chart corresponding to the movement of said weighing mechanism.

12. In a weighing scale, a weighing mechanism, an opaque graduated chart controlled thereby, a housing for said chart, a plurality of screens stationarily mounted therein, and means within said housing cooperating with said chart for reflecting designations from said chart, and means for directing said designations upon each of said screens.

13. In a weighing scale, a weighing mechanism, a rotatably mounted drum chart controlled thereby, a housing enclosing said chart and having a pair of oppositely facing screens in its walls, fixed reflectors facing said screens, adjustable reflecting means within said drum chart cooperating with said chart for directing an image of the same portion of said chart upon said fixed reflectors, said latter reflectors directing said image upon each of said screens.

14. In a weighing scale, a weighing mechanism, a hollow chart having parallel spaced rows of markings, said chart being controlled by said mechanism, a reflecting device within the hollow chart cooperating with said chart to reflect markings therefrom, means for adjusting said reflecting device relative to said chart to associate it with any one of said chart rows, said means including a threaded shaft within the hollow chart on which said reflecting device is threadedly mounted, means for rotating said shaft to thereby move said reflecting device along the shaft, and an exteriorly visible indicator operated by said last-named means for indicating which row has been associated with the reflecting device.

15. In combination, a hollow cylindrical opaque chart having a series of graduations marked on its interior, a plurality of oppositely facing screens, means within said chart for reflecting said graduations from said chart, and means for magnifying the reflection of said graduations and projecting it upon said screens and means to move said chart and reflecting means relatively to each other.

16. In a scale, an arcuately shaped chart bearing a plurality of parallel series of graduations, a reflector positioned at the hollow side of the chart for reflecting a graduation therefrom, means for adjusting the chart and reflector relatively from one series to another whereby any of said series may cooperate with the reflector weighing mechanism for moving said chart and reflector relatively to select a graduation of one of the series to be reflected and a screen upon which the reflection of said graduation is displayed.

17. In combination, a hollow chart bearing a series of graduations, a reflector positioned within the chart for reflecting a graduation therefrom, means for moving said chart to position different parts thereof for cooperation with the reflector to select a graduation to be reflected, and a screen upon which the reflection of said graduation is displayed.

18. In combination, a cylindrical chart bearing a series of graduations, a reflector positioned within the chart for reflecting a graduation thereof, means for rotating the chart to position different parts thereof for cooperation with the reflector, a fixed housing for enclosing said chart, and an exteriorly visible screen mounted in said housing for receiving the reflection of said graduation.

19. In combination, a hollow rotatably mounted scale chart, gravity operated means for rotating said chart, a housing completely enclosing said chart, an exteriorly visible screen fixedly mounted in said housing, and means cooperatively associated with the chart for projecting an image of a portion of said chart on said screen.

20. In combination, in a scale, a hollow, rotatably mounted opaque chart bearing a series of graduations, a housing completely enclosing said chart, an exteriorly visible screen fixedly mounted in said housing, projecting means for casting an image of graduations of said chart on said screen, and weighing mechanism for rotating said chart to select the graduations for projection by said projecting means.

21. In combination, a vertically mounted hollow chart bearing a plurality of series of horizontally arranged indications, a housing completely enclosing said chart, an exteriorly visible screen carried by said housing, means for projecting indications from said chart upon said screen, means for moving said chart and projecting means relatively in a vertical direction to select one of the series for projection, and means for moving said chart and projecting means relatively horizontally for selecting indications from the selected series for projection upon the screen.

22. As a sub-combination, a chart, means for illuminating a certain portion of said chart, a pair of reflectors at an angle to each other and each facing said portion of the chart to receive and reflect a separate image of said portion, and means at a distance from said reflector located in the path of the images reflected by said reflectors for intercepting said images.

23. In combination, a chart, means to illuminate a certain portion of said chart, a pair of reflectors each at the same angle of incidence to a plane perpendicular to the surface of the chart at the illuminated portion, said reflectors being disposed at an angle to each other to receive and reflect separate images of said chart portion, means for moving said chart and reflectors relatively to place different portions of said chart in cooperation with said reflectors, and means at a distance from said reflectors disposed in the path of and intercepting the images reflected by said reflectors.

24. In a computing device, in combination, force resisting mechanism, a drum chart connected thereto and having a plurality of different rate rows, each row having indications based on a different rate per unit of force, and a projector movably mounted within said drum chart for selectively projecting each of said rate rows.

In testimony whereof I hereto affix my signature.

FRED M. CARROLL.